United States Patent [19]
Czetto, Jr.

[11] Patent Number: 5,723,201
[45] Date of Patent: Mar. 3, 1998

[54] PENETRATION RESISTANT PROTECTIVE ARMOR CONSTRUCTION

[76] Inventor: Paul Czetto, Jr., 164 Cocoa Dr., Tavernier, Fla. 33070

[21] Appl. No.: 651,550

[22] Filed: May 22, 1996

[51] Int. Cl.$^6$ .................................................. B32B 3/28
[52] U.S. Cl. .................... 428/181; 428/175; 428/176
[58] Field of Search .................................. 428/181, 175, 428/176

[56] References Cited

U.S. PATENT DOCUMENTS 4,760,932  8/1988  Rhodes, Jr. ............................. 220/5 A

*Primary Examiner*—Christopher Raimund
*Attorney, Agent, or Firm*—Larson & Taylor

[57] ABSTRACT

A protective armor construction includes a plurality of layers of penetration resistant material. These layers comprise one or more expandable stress layers of flexible penetration resistant material having a plurality of folds therein. The folds are arranged so as to unfold and expand in response to a penetration force exerted on the armor construction, e.g., by a bullet, such as to impede the penetration force and to thereby limit penetration of the armor construction. To provide superior protection, two or more of such expandable stress layers are provided along with multiple unfolded layers disposed in front and behind these layers. The folds of the two expandable layers extend orthogonally to one another while the folds of the individual expandable layers over lap. The folds of the outermost expandable layer face outwardly while the folds of the innermost expandable layer face inwardly.

23 Claims, 2 Drawing Sheets

PENETRATION RESISTANT PROTECTIVE ARMOR CONSTRUCTION

FIELD OF THE INVENTION

The present invention relates to body armor constructions and, more particular, to an improved body armor construction which, among other advantages, is capable of repelling bullets that fully penetrate body armor presently on the market.

BACKGROUND OF THE INVENTION

Throughout the years, a large number of different approaches have been taken in designing body armor such as "bulletproof" vests and the like. During this time, there have been developments in both the construction of such body armor and the materials used in the making the armor. For example, in the latter regard, penetration resistant fabrics and materials woven from an aramid fiber available from du Pont under the trademark KEVLAR have been employed to advantage. Stacks or layers of woven KEVLAR fibers provide very high resistance to projectile penetration, and vests or other protective clothing made from stacked KEVLAR layers are relatively comfortable to wear because of the thinness, light weight and flexibility thereof.

One difficulty presented to the designer and/or manufacturer of body armor is the continuing developments in projectiles, i.e., bullets and the like, and in the armaments for delivery of the projectiles. In this regard, bullets of vastly increased penetration characteristics, and stopping power, have developed and are now being produced. The type and number of layers of protective material used in a protective garment such as a bullet proof vest generally depends on, among other factors, the threat level presented by the bullet type and the maximum velocity of the bullet. While, in theory, most threat levels can be met by simply using more and more layers of a material, such as a KEVLAR fabric, so as to thus produce a relatively thick composite (e.g., a thickness on the order of one or one and one-half inches might be needed in some instances), there are obvious disadvantages to such a "brute force" approach from such standpoints of cost, wearability, comfort and the like. In this regard, the fatigue factor associated with wearing a "bulletproof" vest increases directly with the weight of the vest, and even a small difference in increased weight produced by a thicker vest can be significant.

Patents of related interest in the field of body armor and the like include the following: U.S. Pat. No. 5,471,906 (Bachner, Jr. et al.), U.S. Pat. No. 5,443,883 (Park), U.S. Pat. No. 5,395,671 (Coppage, Jr. et al.), U.S. Pat. No. 5,362,527 (Harpell et al.), U.S. Pat. No. 5,087,516 (Groves), U.S. Pat. No. 4,989,266 (Borgese et al.), U.S. Pat. No. 4,660,223 (Fritch), U.S. Pat. No. 4,608,717 (Dunbavand), U.S. Pat. No. 3,562,810 (Davis), U.S. Pat. No. 3,409,907 (Barratt), U.S. Pat. No. 2,816,578 (Frieder et al.), U.S. Pat. No. 1,574,188 (Friedman), and U.S. Pat. No. 1,465,767 (Krause).

Briefly considering these patents, the Bachner, Jr. et al. patent discloses body armor made of multiple plies of KEVLAR or the like and provides for the use of twenty-six to thirty plies of KEVLAR 129 in meeting a threat level of IIIA.

The Park patent discloses a ballistic laminate structure in sheet form including first and second arrays of unidirectional fiber bundles "cross-plied at an angle" with respect to each other.

The Coppage, Jr. et al. patent discloses a protective fabric which is said to be capable of stopping the penetration of a 44 Magnum and which comprises layers of non-woven and woven fabrics of KEVLAR, and/or SPECTRA wherein the layers of woven fabric are quilted together.

The Harpell et al. patent discloses flexible body armor including rigid isolated panels positioned between sandwiching layers.

The Groves patent discloses body armor including multiple layers and a specialized arrangement for spreading the impact of the bullet.

The Borgese et al. patent discloses a body armor insert including polyethylene fibers sandwiched between first and second sets of ballistic cloth plies made from KEVLAR and the like. The polyethylene fiber plies are not sewn together.

The Fritch patent discloses protective body armor including panels arranged in overlapping and abutting relationship but not joined to one another except by way of overlying and underlying felted material plies.

The Dunbavand patent discloses flexible protective armor comprising a laminate made of front and back layers of KEVLAR and an intermediate bag of packed feathers, foam, or felt material.

The Davis patent discloses a protective material including an arrangement using crossed weaves.

The Barrat patent discloses body armor including overlapping pockets each containing a fabric strip to which a series a overlapping metal plates are secured.

The Frieder patent discloses a ballistic cloth construction including what appear to be overlapping bands.

The Friedman patent discloses a protecting device made of canvas or the like and including a succession of overlapping sheathes. Composites including sheets of aluminum alloy are inserted into the sheaths.

The Krause patent discloses bullet proof armor including a plurality of metal plates sandwiched in overlapping fashion between layers including a quilted member.

SUMMARY OF THE INVENTION

In accordance with the present invention, a penetration resistant armor construction is provided which is capable of stopping bullets (such as polytetrafluoroethylene (TEFLON) coated bullets) which fully penetrate body armor presently commercially available. Further, the construction is relatively thin and light in weight, particularly as compared with the embodiments of the constructions described above that would be necessary to provide even comparable penetration resistance.

In accordance with the invention, a protective armor construction is provided which comprises a plurality of layers of penetration resistant material, at least one of the layers comprising an expandable layer of flexible penetration resistant material having a plurality of folds therein arranged so as to unfold and expand, in response to a penetration force exerted on the armor construction, such as to impede the penetration force and to thereby limit penetration of the armor construction.

Preferably, the armor construction includes two or more of the expandable layers having a plurality of folds therein. Advantageously, the folds of a first layer of the two or more expandable layers extend orthogonally to the folds of a further layer of the two or more layers.

In an embodiment employing two layers, the folds of the layers are preferably directional folds and face in opposite directions. In an advantageous implementation of this embodiment, the folds of the outermost of the first and further layers face outwardly and the folds of the innermost of the first and further layers face inwardly.

In one preferred embodiment, in use of the armor construction, the folds of said one layer extend substantially vertically and the folds of another layer extend substantially horizontally.

In an alternative embodiment, in use of the armor construction, the folds of two expandable layers both extend diagonally so as to criss cross one another.

Preferably, the folds of the plurality of folds overlap one another.

In an advantageous embodiment, the folds of the plurality of folds extend completely from top to bottom and side to side of the armor construction.

In a preferred implementation, the folds of the plurality of folds comprise straight, unsewn folds.

The plurality of layers of the armor construction preferably comprise at least one unfolded layer disposed on each side of the expandable layer. In an implementation wherein the armor construction includes two or more expandable layers having a plurality of folds therein, the plurality of layers further comprises at least one unfolded layer disposed on each side of each of the two or more expandable layers.

In an advantageous implementation, the plurality of layers comprises at least two unfolded layers disposed on each side of each of the two or more expandable layers.

In an embodiment providing additional penetration protection, the armor construction includes first and second expandable layers having a plurality of folds therein and the plurality of layers further comprises three unfolded layers disposed on one side of the first expandable layer, three unfolded layers disposed between the other side of the first expandable layer and one side of the second expandable layer, and three unfolded layers disposed on the other side of the second expandable layer.

Preferably, at least the expandable layer or layers comprise a woven aramid fiber fabric. Advantageously, in an implementation particularly suitable for use in body armor, all of the penetration resistant layers comprise a woven aramid fiber fabric.

Further features and advantages of the invention will be set forth in, or apparent from, the following detailed description of the preferred embodiment of the invention.

DESCRIPTION OF THE PREFERRED EMBODIMENTS

Figure 1:
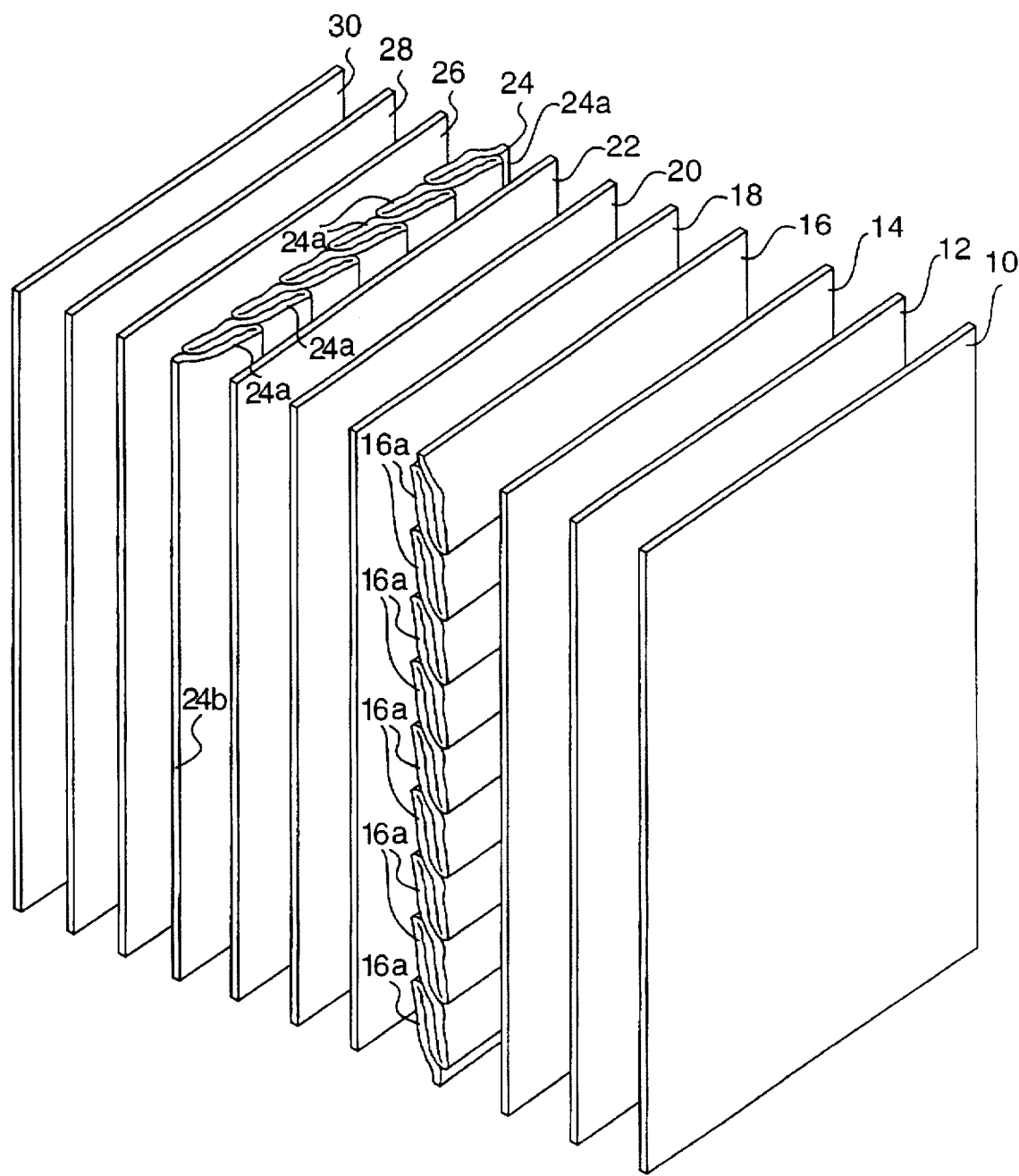
FIG. 1 is an exploded perspective view of a protective armor construction in accordance with a first preferred embodiment of the invention.

Referring to FIG. 1, a first preferred embodiment of the body armor construction of the invention is shown. In this embodiment, the armor construction is formed by eleven layers or sheets of a penetration resistant material, the layers being denoted 10, 12, 14, 16, 18, 20, 22, 24, 26, 28 and 30. For purposes of discussion, layer 10 is considered to be the outermost layer, i.e., the layer outwardly facing on surface layer of the armor construction (although it will be appreciated that the final armor construction can, of course, also include a cover layer or layers), and layer 30 is the innermost layer, i.e., the layer closest to the body. Although the invention will be described below in connection with embodiments which provide protection for the body, it is to be understood that the invention is also applicable to other types of protective armor such as that used in armored vehicles (e.g., in the door panels, roof, floor, seats, etc.), for protective shielding (e.g., in a courtroom), in specialized protective wall constructions, and the like. Further, while the discussion below will center on stopping bullets, the construction of the invention will also protect against other ballistic missiles or projectiles such as lead shot, fragments of shrapnel or other bursting projectiles.

In the embodiment of FIG. 1, the outermost three layers 10, 12 and 14, the three intermediate layers 18, 20 and 22 and the innermost three layers 26 28 and 30 are simply sheets or plies of a penetration resistant material. The material used is preferably KEVLAR although other materials can also be used. Such other materials including those sold under the trademarks SPECTRA for woven fabrics and SPECTRA SHIELD for a non-woven reinforced plastic, both available from Allied Signal, Inc. of Morristown, N.J., and under the trademark TWARON CT2000 for aramid fibers available from Akzo Chemical Company of the Netherlands. It will be appreciated that a plastic such as SPECTRA SHIELD may be unsuitable for use in some body armor but may, e.g., be very useful in applications involving armored vehicles or the like.

Figure 2:
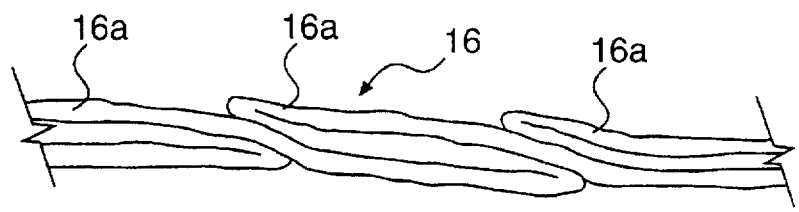
FIG. 2 is a side elevational view of a portion of one of the "stress" layers or sheets of the armor construction of FIG. 1.

Intermediate layers 16 and 24 are also made of a penetration resistant material. In this regard, the material used is preferably one of the materials discussed above, and, in a preferred embodiment, is KEVLAR, but because the material must be flexible, it is to be understood that a woven fabric would be suitable while a rigid plastic would not. As is perhaps best seen in FIG. 2, layer 16 includes a plurality of folds or pleats 16a formed therein and arranged side-to-side in an overlapping manner. The fold lines of folds 16a extend generally parallel to the upper and lower edges 16b and 16c (see FIG. 1) of layer 16. Folds 16a are preferably unsewn although, given the function thereof as described below, it would be possible to sew the folds 16a with light stitching so that the folds would be held together during normal handling but would expand or unfold in use.

Layer 24 is similar to layer 16 and includes similar, spaced parallel, side-to-side, overlapping folds 24a. However, the fold lines of folds 24a extend generally parallel to the lateral edges 24b and 24c of layer 24 (see FIG. 1) and, thus, transverse or orthogonal to folds 16a of layer 16.

Figure 3:
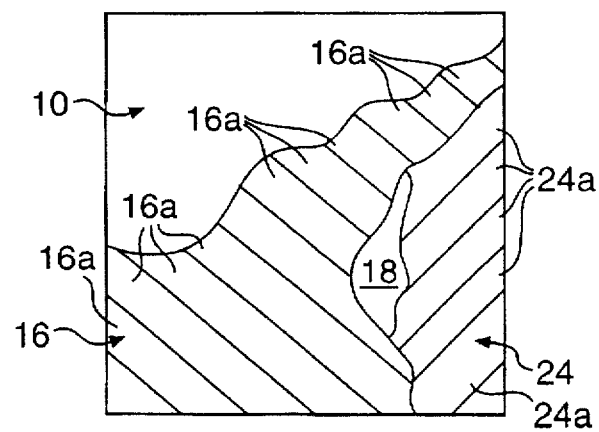
FIG. 3 is a plan view of a further embodiment of the invention, partially broken away to show various layers.

Referring to FIG. 3, a further embodiment of the invention is shown. This embodiment is very similar to that of FIG. 1 and corresponding elements have been given the same reference numerals. As shown in FIG. 3, which is broken away to show selected layers 16, 18 and 24 behind outer layer 10, the respective folds 16a and 24a of layers 16 and 24 are arranged diagonally or on a bias and, as in the embodiment of FIG. 1, extend orthogonally to one another. Apart from the angles defined by the folds 16a and 24a, this embodiment otherwise corresponds to that of FIG. 1.

Figure 4:
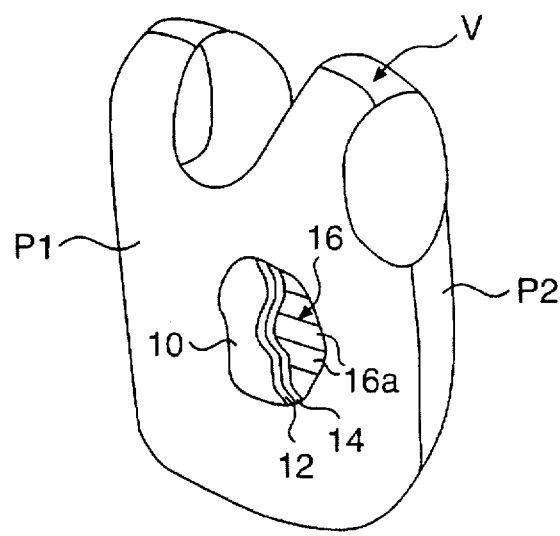
FIG. 4 is a perspective view of a vest incorporating the armor construction of FIG. 1.

Referring to FIG. 4, the protective armor construction of the invention is shown as incorporated in a conventional "bulletproof" vest V. Vest V can, of course, take many different forms and, in the embodiment illustrated, is of a sleeveless, slipover type including front and back panels P1 and P2. In this embodiment, front panel P1 is of a construction similar to that of FIG. 1 and, in FIG. 4, is partially broken away to show layer 16 with horizontal folds 16a. Of course, the back panel P2 can be similarly constructed.

Considering the folds 16a and 24a in more detail, it has been found that for ease of manufacture, longer garment (e.g., vest) life, and maximum protection, the folds are preferably three-fourths of an inch (¾") to one and one-eighth of inch (1⅛") long. Further, the folds 16a and 24a should overlap so that any impacting bullet cannot impact on an area which is not part of a fold. This effect is enhanced by the provision of orthogonal folds in different folded layers (e.g., in vertical and horizontal folds), so that first layer will, as described below, provide more "ride" or "travel" in one direction and the next panel will provide more "ride" or "travel" in a perpendicular direction.

The purpose of folds 16a and 24a of layers or sheets 16 and 24 is generally to provide "pre-slacking" of the body armor. In other words, these "stress" layers 16 and 24 provide for a gathering of the material from which they are made which is released as the folds 16a and 24a unfold and expand in response to a penetration force, such as produced by a bullet acting thereon. Stated differently, the folds 16a and 24a supply built-in "give" to the body armor, e.g., vest V, so that when a bullet impacts the vest V, the vest V has a longer time, and a longer distance, over which to provide deceleration of the bullet. Accordingly, the impact dwell time, which is critical, is increased at the folded layer or layers and the bullet is prevented from penetrating the vest. The folds 16a, which face outwardly in a preferred embodiment, will unfold or pull apart to slacken the corresponding layer 16 such that the layer 16 will "ride" or "travel" in front of the bullet and thus, concentrated stressing of the layer 16 such as is needed to provide penetration thereof is less easily achieved. The second folds 24a preferably face inwardly so as to provide less stressing, and more "ride" distance to further impede and ultimately stop the bullet, and to also reduce the blunt action trauma caused to the wearer of the vest.

It is to be understood that the overall number of layers and the number of folded "stress" layers (corresponding to layers 16 and 24), can vary from that described above in connection with FIGS. 1 to 4. For example, to provide maximum protection, layers with vertical folds, horizontal folds and diagonal folds can be used. Such embodiments, in common with the ones described above, provide excellent penetration protection and have been found in tests to repel Teflon coated solid brass bullets (the KTW 38 special) as well as the 0.357 Magnum kinetic high impact bullets and high penetration bullets developed by the inventor (see, e.g., U.S. Pat. Nos. 4,938,147 and 5,099,765). Both of these types bullets will fully penetrate the body armor currently in the marketplace, and the Teflon coated bullet (the infamous so-called "cop-killer" bullet) has been outlawed.

On the other hand, excellent results can be achieved with only one "stress" layer (corresponding to one of layers 16 and 24) and, in this regard, a construction incorporating such a single layer is effective in stopping most handgun cartridges in threat levels I, IIA and II. With a single "stress" layer construction, an arrangement wherein the stress layer is located six layers inside the vest, and eight further layers as provided behind this stress layer, provides a significant increase in protection over commercial vests. In general, it has been found that the first "stress" (folded) layer should be at least the fourth layer from the outside, and two to four non-folded layers should be provided between folded layers. However, while it would generally be difficult from a manufacturing standpoint to locate and maintain a stress layer as the extreme outside layer, even this construction would be of advantage. In general, it will be appreciated that given the vast number of bullets having different constructions, calibers, and velocities, and the different requirements which exist regarding such things as the amount of protection to be provided, the threat levels sought to be defeated by particular armor, and the weight and thickness of the armor it is difficult to be definitive about the usefulness of configurations which use one or more stress layers but depart from the preferred implementations that are described above.

Although the present invention has been described to specific exemplary embodiments thereof, it will be understood by those skilled in the art that variations and modifications can be effected in these exemplary embodiments without departing from the scope and spirit of the invention.

What is claimed is:

1. A protective armor construction comprising
   a plurality of layers of material, at least one of said layers comprising an expandable layer of flexible ballistic resistant material having a plurality of folds therein, the folds of said plurality of folds overlapping one another and being arranged so as to unfold and expand in response to a ballistic force exerted on the armor construction such as to impede the ballistic force and to thereby limit penetration of the armor construction.

2. A construction as claimed in claim 1 wherein said construction includes at least two said expandable layers having a plurality of folds therein.

3. A construction as claimed in claim 2 wherein the folds of a first layer of said at least two expandable layers extend orthogonally to the folds of a further layer of said at least two layers.

4. A construction as claimed in claim 3 wherein the folds of said first and further layers are directional folds and face in opposite directions.

5. A construction as claimed in claim 4 wherein the folds of the outermost of said first and further layers face outwardly and the folds of the innermost of said first and further layers face inwardly.

6. A construction as claimed in claim 3 wherein, in use of the armor construction, the folds of said first layer extend substantially vertically and the folds of said further layer extend substantially horizontally.

7. A construction as claimed in claim 3 wherein, in use of the armor construction, the folds of said first layer and said further layer both extend diagonally so as to criss cross one another.

8. A construction as claimed in claim 1 wherein the folds of said plurality of folds extend completely from top to bottom and side to side of the armor construction.

9. A construction as claimed in claim 1 wherein the folds of said plurality of folds comprise straight, unsewn folds.

10. A construction as claimed in claim 1 wherein said plurality of layers comprises at least one unfolded layer disposed on each side of said expandable layer.

11. A construction as claimed in claim 9 wherein said construction includes at least two expandable layers having a plurality of folds therein.

12. A construction as claimed in claim 11 wherein said plurality of layers further comprises at least one unfolded layer disposed on each side of each of said at least two expandable layers.

13. A construction as claimed in claim 11 wherein said plurality of layers comprises at least two unfolded layers disposed on each side of each of said at least two expandable layers.

14. A construction as claimed in claim 1 wherein said armor construction includes first and second expandable layers having a plurality of folds therein and wherein said plurality of layers further comprises three unfolded layers disposed on one side of said first expandable layer, three unfolded layers disposed between the other side of said first expandable layer and one side of said second expandable layer, and three unfolded layers disposed on the other side of said second expandable layer.

15. A construction as claimed in claim 1 wherein at least said at least one expandable layer comprises a woven aramid fiber fabric.

16. A construction as claimed in claim 1 wherein all of said penetration resistant layers comprise a woven aramid fiber fabric.

17. A construction as claimed in claim 1, wherein the folds of said plurality of folds comprise folded over portions of said expandable layers arranged such that one folded over portion overlaps an adjacent folded over portion in a sequential pattern.

18. A construction as claimed in claim 17, wherein said folded over portions comprise laterally flattened folds.

19. A construction as claimed in claim 18, wherein said folded over portions comprise unsewn folds and said expandable layer comprises a woven aramid fiber fabric.

20. A penetration resistant armor construction including:
a first plurality of layers of a ballistic resistant material including an inner layer and an outer layer;
a first intermediate layer disposed adjacent to the inner layer of said first plurality of layers and comprising a plurality of spaced folds arranged in spaced relation between opposed edges thereof;
a second plurality of layers of ballistic resistant material including a first layer disposed adjacent to said first intermediate layer and a further layer;
a second intermediate layer of a flexible ballistic resistant material disposed adjacent to said further layer of said second plurality of layers and comprising a plurality of spaced folds arranged in spaced relation between opposed edges thereof, said folds of said second intermediate layer extending orthogonally to the folds of said first intermediate layer; and
a third plurality of layers of ballistic resistant material including a first layer disposed adjacent to said second intermediate layer and at least one further layer.

21. A construction as claimed in claim 20, wherein the folds of each of said first and second intermediate layers overlap each other.

22. A construction as claimed in claim 20, wherein the folds of said first and second intermediate layers are directional and face in opposite directions.

23. A protective armor construction comprising a plurality of layers, at least two of said layers comprising expandable layers of flexible, ballistic resistant material having a plurality of folds therein, said folds arranged so as to unfold and expand in response to a ballistic force exerted on the armor construction such as to impede the ballistic force and to thereby limit the penetration of the armor construction, wherein the folds of a first layer of said at least two expandable layers extend orthogonally to the folds of a further layer of said at least two layers.

* * * * *